United States Patent Office 3,826,723
Patented July 30, 1974

3,826,723
PROCESS FOR RECOVERING GOLD AND SILVER
Jack L. Woods, Ogden, and Tobe A. Pittman, Centerville, Utah, assignors to Elmet, Inc., Centerville, Utah
No Drawing. Filed July 13, 1972, Ser. No. 271,545
Int. Cl. C23b 5/26, 5/28
U.S. Cl. 204—110
1 Claim

ABSTRACT OF THE DISCLOSURE

A unique, continuous extraction process for extracting gold and/or silver from ores containing such values. The process utilizes, in addition to one or more leaching compounds, a stabilized, oxidizing electrolyte or electrolytes which accelerates leaching in addition to providing an electrolyte for effecting the subsequent continuous electrodeposition of such metals.

---

The present invention relates to the extraction of precious metals from ores and, more particularly, pertains to a process for recovering gold and/or silver from ores containing the same.

The present invention utilizes unique scientific technology as an approach to the recovery of gold and silver. Specifically contributed to the art and advancing the same is the unique concept, embodied herein, of utilizing a stabilized oxidizing agent such as stabilized hydrogen peroxide, this in combination in unique amount with one or more leaching agents, to effect the recovery of gold and/or silver by extraction and ultimate electro-deposition.

In the past, gold and silver have been leached from their ores by the use of cyanide salt solutions such as potassium cyanide and sodium cyanide. Additionally, hydrogen cyanide, converted to either potassium cyanide or sodium cyanide, has already previously likewise been used in connection with leaching solutions. Finally, mixtures of cyanides and various alkalies date back many years as appropriate solutions for leaching precious metals.

The extraction of precious metals by utilizing the above prior techniques is slow, even with air agitation, and requires several days to effect a dissolving of most of the metals sought for in the leaching solution. In addition, such an extraction process very seldom results in over 90% recovery of the metals from their ores.

The inventors have discovered that stabilized solutions of peroxides, when added to balanced alkali metal cyanide solutions, results in the extraction of the precious metals very rapidly and with practically 100% recovery.

Accordingly, a principal object to the present invention is to provide a new and useful process, and combination leaching and electrolytic solution, for the extraction of gold and silver values from ores containing one or both of the same.

An additional object is to provide a method of accelerating the leaching process as pertains to the recovery of gold and silver from their ores, this by utilizing a stabilized oxidizing agent that can serve as an electrolyte.

An additional object of the invention is to provide a method of effecting continuous electro-deposition of gold and/or silver from an extraction electrolyte containing a stabilized oxidizing agent.

A further object of the invention is to modify cyanide salt containing solutions, as leaching solutions, such as to speed up the leaching process without destroying the leaching effect of the particular cyanide compound or compounds utilized.

The features of the present invention may best be understood with reference to the following detailed description thereof.

By way of example in the present invention, a solution containing 60 grams per liter of sodium cyanide, 1 gram per liter of sodium ligno sulfonate, and 5 milliliters of 50% stabilized hydrogen peroxide (e.g. Du Pont Albone 50%), in one experiment extracted 99.1% of the gold from the treated ore in the short time of 50 minutes. The same ore when treated with a solution containing 60 grams per liter of sodium cyanide, only, extracted 32% of gold after 15 days. The same cyanide solution using violent air agitation extracted about 84% of the gold contained therein after 4 days. It can thus easily be seen that the balanced electrolyte containing the hydrogen peroxide results in thorough and rapid extraction of the precious metal involved.

Improved results as above indicated have been found where the range of the alkali metal cyanide varies from 1 to 600 grams per liter and the sulfonate used falls within a range of from 0.1 to 10 grams per liter.

It has been found through experimentation that the same order of magnitude of the extraction times and percentage yields of metals holds true likewise for silver ores heretofore processed; in addition, this holds true for ores containing both gold and silver.

The above being true and being experimentally determined, the investigation has led to use of continuous electro-deposition of such precious metals from their ores. Thus, the above described balanced electrolyte is suitable for electro-deposition of gold and silver or a gold-silver alloy, this depending upon the ore used. For example, the electrolyte containing a cyanide metal salt, a ligno sulfonate (sodium, calcium or potassium), and the peroxide may be percolated through the precious metal ore and the resulting solution containing gold, silver or a mixture of both can be circulated through an electrolytic cell. Enclosed in such cell may be a conventional revolving drum, made of stainless steel or titanium or the like, which will serve as a cathode. The tank being the anode, the same can be made of stainless steel. The gold and/or silver will deposit on the revolving drum which can be half-immersed in the electrolyte. Since the metal deposit does not tightly bond to the surface it can break free as a continuous ribbon of precious metal. In the event of recovery of such continuous ribbon, it is suggested that a current density of about one-third to 5 amperes per square foot be applied to the revolving drum.

Accordingly, the present invention comprehends as an electrolyte solution in one embodiment the following:

sodium cyanide or potassium cyanide,
sodium ligno sulfonate, calcium ligno sulfonate, or potassium ligno sulfonate (one of such ligno sulfonates being recommended for addition), and
stabilized hydrogen peroxide (50% solution recommended) in such amount that, the hydrogen peroxide used represents an amount equivalent to from one-eighth pint to three-fourths gallon of 50% hydrogen peroxide added to make thirty gallons of leach and electro-deposition electrolyte.

The above serves as not only a leaching solution or medium but also as an electrolyte which, after having leached through the applicable ore, may immediately be made available to electrolysis for the direct recovery of deposited metal (gold, silver or both).

Sodium peroxide or potassium peroxide may be used equally as well as hydrogen peroxide.

While particular embodiments of the invention have been described, it will be obvious to those skilled in the art the various changes and modifications which may be made without departing from the essential features of the present invention and, therefore, the aim in the appended claim is to cover all such changes and modifications as fall within the true spirit and scope of the invention.

We claim:
1. The process of recovering at least one of a class of metals, consisting of gold and silver, from ore, comprising the steps of leaching said ore with a solution containing a cyanide salt and an oxidizing agent, and recovering such metal through electro-deposition, said solution also containing one of the following ligno sulfonates: potassium ligno sulfonate, calcium ligno sulfonate, and sodium ligno sulfonate.

References Cited

UNITED STATES PATENTS

| | | | |
|---|---|---|---|
| 3,180,705 | 4/1965 | Freedman | 204—46 |
| 3,020,217 | 2/1962 | Rinker | 204—46 |
| 2,843,538 | 7/1958 | Haugen | 204—110 |
| 2,800,439 | 7/1957 | Fischer et al. | 204—46 |
| 2,771,411 | 11/1956 | Chester et al. | 204—46 |
| 2,810,682 | 10/1957 | Brown | 204—216 |

FOREIGN PATENTS

| | | | |
|---|---|---|---|
| 25,016 | 7/1895 | Great Britain | 204—110 |

JOHN H. MACK, Primary Examiner

R. L. ANDREWS, Assistant Examiner